United States Patent
Ikeda et al.

(10) Patent No.: US 10,583,558 B2
(45) Date of Patent: Mar. 10, 2020

(54) ROBOT CONTROL DEVICE

(71) Applicant: FANUC CORPORATION, Yamanashi (JP)

(72) Inventors: Yu Ikeda, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 225 days.

(21) Appl. No.: 15/867,311

(22) Filed: Jan. 10, 2018

(65) Prior Publication Data
US 2018/0200885 A1 Jul. 19, 2018

(30) Foreign Application Priority Data
Jan. 17, 2017 (JP) ................................ 2017-006070

(51) Int. Cl.
*B25J 9/16* (2006.01)
*G05B 19/401* (2006.01)

(52) U.S. Cl.
CPC .......... *B25J 9/1653* (2013.01); *B25J 9/1633* (2013.01); *B25J 9/1692* (2013.01); *G05B 19/401* (2013.01); *B25J 9/161* (2013.01); *Y10S 901/09* (2013.01); *Y10S 901/28* (2013.01)

(58) Field of Classification Search
CPC ...... B25J 9/1653; B25J 9/1633; B25J 9/1692; B25J 9/161; G05B 19/401; Y10S 901/09
See application file for complete search history.

(56) References Cited

U.S. PATENT DOCUMENTS

| | | | |
|---|---|---|---|
| 9,002,519 B2 * | 4/2015 | Ohta | B25J 9/1633 700/245 |
| 9,423,782 B2 * | 8/2016 | Imada | G05B 19/19 |
| 9,643,317 B2 * | 5/2017 | Yajima | B25J 9/1674 |
| 2006/0206284 A1 | 9/2006 | Hirabayashi | |
| 2008/0133176 A1 | 6/2008 | Kashio et al. | |
| 2013/0061695 A1 | 3/2013 | Sato | |
| 2013/0218331 A1 | 8/2013 | Nammoto et al. | |
| 2014/0238157 A1 | 8/2014 | Sato | |

(Continued)

FOREIGN PATENT DOCUMENTS

| CN | 1833830 A | 9/2006 |
|---|---|---|
| CN | 101116042 A | 1/2008 |

(Continued)

OTHER PUBLICATIONS

Decision to Grant dated Dec. 11, 2018, for Japanese Patent Application No. 2017-006070.

(Continued)

*Primary Examiner* — Nicholas Kiswanto
(74) *Attorney, Agent, or Firm* — Karceski IP Law, PLLC (57) ABSTRACT

A robot control device includes a parameter estimating unit that causes a robot to operate under estimation conditions input by a user and that estimates a load parameter of a load attached to the robot, a torque calculating unit that calculates operation torques of respective joints of the robot caused to operate during the estimation of the load parameter, and an alert unit that issues an alert to the user when the difference between the maximum value and the minimum value of the operation torques is equal to or less than a predetermined threshold.

3 Claims, 5 Drawing Sheets

(56) References Cited

U.S. PATENT DOCUMENTS

| | | |
|---|---|---|
| 2014/0316572 A1 | 10/2014 | Iwatake |
| 2015/0148950 A1 | 5/2015 | Nammoto et al. |
| 2015/0370242 A1 | 12/2015 | Takeno |
| 2016/0008978 A1 | 1/2016 | Oguri |
| 2016/0121484 A1 | 5/2016 | Ikeda et al. |
| 2016/0214257 A1 | 7/2016 | Sejimo et al. |
| 2016/0327934 A1 | 11/2016 | Morimoto |
| 2018/0036891 A1 | 2/2018 | Monsarrat et al. |
| 2018/0147735 A1 | 5/2018 | Kuno et al. |

FOREIGN PATENT DOCUMENTS

| | | |
|---|---|---|
| CN | 103252779 A | 8/2013 |
| CN | 105313118 A | 2/2016 |
| CN | 105573249 A | 5/2016 |
| CN | 105818155 A | 8/2016 |
| CN | 106113066 A | 11/2016 |
| DE | 102014005434 B4 | 3/2016 |
| DE | 102015013635 A1 | 5/2016 |
| DE | 102012017328 B4 | 8/2016 |
| EP | 2980986 A1 | 2/2016 |
| JP | H03055189 | 3/1991 |
| JP | H10138187 | 5/1998 |
| JP | 2004025387 A | 1/2004 |
| JP | 4858229 A | 1/2012 |
| JP | 2012040634 A | 3/2012 |
| JP | 5837148 A | 12/2015 |
| JP | 2016049608 A | 4/2016 |
| JP | 2016075156 A | 5/2016 |
| JP | 2016087700 A | 5/2016 |
| KR | 20110048870 A | 5/2011 |
| WO | 2014156164 A1 | 10/2014 |
| WO | 2016194029 A1 | 12/2016 |

OTHER PUBLICATIONS

Chinese Office Action dated Apr. 15, 2019, for Chinese Patent Application No. 201810029967.0.
German Office Action dated Mar. 6, 2019, for German Patent Application No. 102018200249.5.
Japanese Search Report from Registered Searching Authority dated Jul. 25, 2018, for Japanese Patent Application No. 2017-006070.

* cited by examiner

FIG. 5

ROBOT CONTROL DEVICE

CROSS-REFERENCE TO RELATED APPLICATIONS

This application is based on and claims priority to Japanese Patent Application No. 2017-006070, filed on Jan. 17, 2017, the entire content of which is incorporated herein by reference.

FIELD OF THE INVENTION

The present invention relates to a robot control device suitable for use in estimating a load parameter of a load that is attached to a robot.

BACKGROUND OF THE INVENTION

In order to cause a robot to correctly operate functions of feedforward, collision detection, etc., it is necessary to obtain load parameters, such as the mass, the position of the center of gravity, and the inertia matrix, of a load that is attached to the robot or a load that is grasped by a hand attached to the robot. In the related art, if the load parameters are unknown, estimation of the load parameters is performed.

For example, Japanese Unexamined Patent Application, Publication No. Hei 03-55189 discloses a technique in which a load is attached via a force sensor, and a load parameter is estimated from a plurality of orientations and an output of the force sensor.

Furthermore, for example, Japanese Unexamined Patent Application, Publication No. Hei 10-138187 discloses a technique in which an operation pattern program is created according to a taught reference position, drive torque is calculated from drive currents of respective axes when the robot is operated according to the created operation pattern program, thereby estimating unknown load parameters on the assumption that this drive torque matches a load torque that includes an unknown mass and center-of-gravity position of the load.

SUMMARY OF THE INVENTION

The present invention provides the following solutions.

According to one aspect, the present invention provides a robot control device including: a parameter estimating unit that causes a robot to operate under estimation conditions input by a user and that estimates a load parameter of a load attached to the robot; a torque calculating unit that calculates operation torques of respective joints of the robot caused to operate during estimation of the load parameter; and an alert unit that issues an alert to the user when the difference between the maximum value and the minimum value of the operation torques is equal to or less than a predetermined threshold.

DESCRIPTION OF EMBODIMENT(S) OF THE INVENTION

First Embodiment

A robot control device according to a first embodiment of the present invention will be described in detail below with reference to the drawings.

A robot control device 1 of this embodiment is provided with: a CPU (Central Processing Unit); a main storage device, such as a ROM (Read Only Memory) or a RAM (Random Access Memory); an auxiliary storage device, such as an HDD (Hard Disk Drive); an input device, such as a keyboard; an output device, such as a monitor; an external interface that exchanges various types of data with an external device, such as a robot; and the like, the above-described constituent devices being connected to one another via a bus and being not shown. The auxiliary storage device stores various programs, and, when the CPU reads the programs from the auxiliary storage device into the main storage device, such as the RAM, and executes them, various types of processing are realized.

Figure 1:
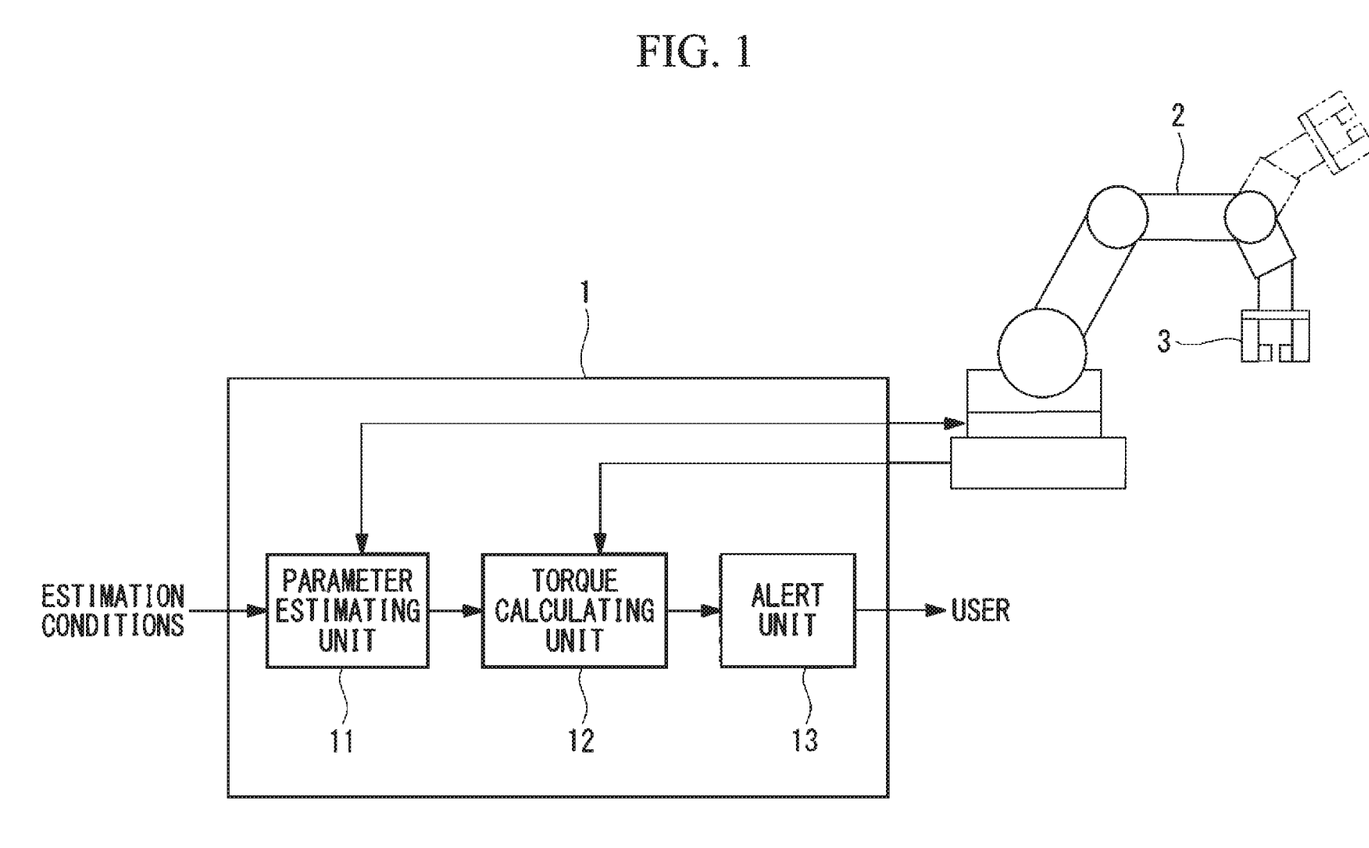
FIG. 1 is a view showing, in outline, the configuration of a robot control device according to a first embodiment of the present invention.

As shown in FIG. 1, the robot control device 1 of this embodiment is provided with, as functional blocks to be executed by the CPU, a parameter estimating unit 11, a torque calculating unit 12, and an alert unit 13.

The parameter estimating unit 11 is connected to the robot 2 and the torque calculating unit 12. The torque calculating unit 12 is connected to the robot 2 and the parameter estimating unit 11. The alert unit 13 is connected to the torque calculating unit 12.

The parameter estimating unit 11 is configured to estimate a load parameter of a load 3 that is attached to the robot 2, by causing the robot 2, which is a real machine, to perform a particular operation (estimation operation) under conditions for estimation (hereinafter, referred to as estimation conditions) that are input by a user. Furthermore, the parameter estimating unit 11 is configured to notify the torque calculating unit 12 that the load-parameter estimation is being performed.

The position and the orientation of the robot 2, the operating range thereof, and the operation velocity and the acceleration thereof when estimation is performed are input as the estimation conditions. Furthermore, among load parameters, if there is a known parameter, such as the weight of the load 3, the known parameter is also input. As the position and the orientation, a shaft angle for deciding the position and the orientation of a shaft that serves as the base point of the estimation operation is input. As the operating range, shaft angles indicating the starting point and the end point of the estimation operation are input. In the example shown in FIG. 1, on the basis of the input estimation conditions, two shafts at the distal end are moved, with a fourth shaft serving as the base point of the estimation operation, thereby causing the robot 2 to perform the estimation operation for parameter estimation. Note that a known technique can be used as a load-parameter estimation method.

While the parameter estimating unit 11 notifies the torque calculating unit 12 that the load-parameter estimation is being performed, the torque calculating unit 12 is configured to calculate operation torques of respective joints that are provided in the robot 2 and that are being operated for the estimation operation. Specifically, the operation torques are calculated by measuring the values of currents flowing in motors of the respective joints.

The alert unit 13 is configured to issue an alert to the user via the monitor or the like only when the difference between the maximum value and the minimum value of the operation torques calculated in the torque calculating unit 12 is equal to or less than a predetermined threshold. The threshold is empirically determined in advance as a percentage with respect to the rated torque. For example, if the threshold is set to 50% of the rated torque, when the difference between the maximum value and the minimum value of the operation torques is equal to or less than 50% of the rated torque, an alert is issued to the user.

Next, processing performed in the robot control device 1, which has the above-described configuration, will be described with reference to FIGS. 1 and 2.

Figure 2:
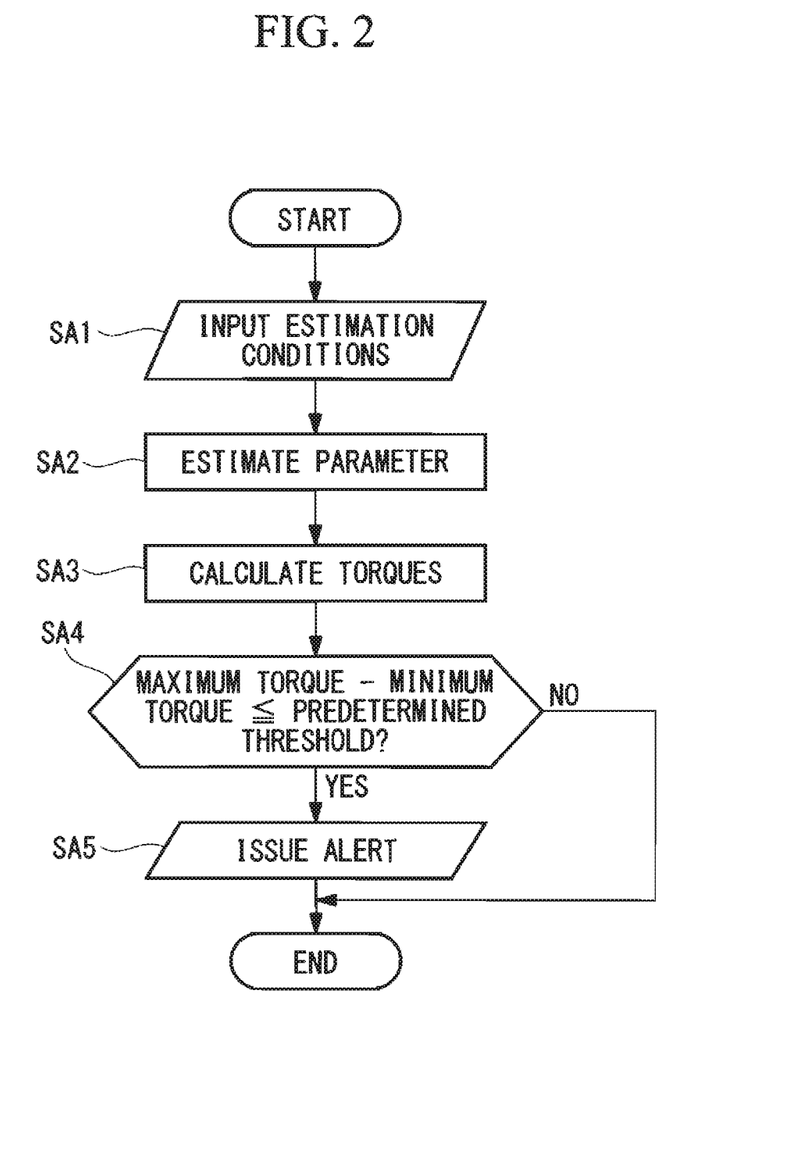
FIG. 2 is a flowchart showing processing performed by the robot control device shown in FIG. 1.

First, the estimation conditions are input by the user (Step SA1 in FIG. 2). Then, the parameter estimating unit 11 causes the robot 2 to operate under the input estimation conditions, thus performing load-parameter estimation for the load 3, which is attached to the robot 2 (Step SA2 in FIG. 2). Next, the torque calculating unit 12 measures the values of currents flowing in the motors provided in the respective joints of the robot 2 caused to operate during the parameter estimation, and calculates the operation torques of the joints on the basis of the measured current values (Step SA3 in FIG. 2). Then, the alert unit 13 determines whether the difference between the maximum torque, which is the maximum value of the calculated operation torques, and the minimum torque, which is the minimum value thereof, is equal to or less than the predetermined threshold (Step SA4 in FIG. 2). Then, when the difference between the maximum torque and the minimum torque is equal to or less than the predetermined threshold, the alert unit 13 issues an alert to the user (Step SA5 in FIG. 2).

In this way, when the difference between the maximum torque and the minimum torque is equal to or less than the predetermined threshold, the change in the operation torque is small, thus causing a small change in the orientation of the robot 2 during the estimation operation; therefore, it is possible to predict that an estimated load parameter does not have a sufficient accuracy. Thus, in this case, an alert is issued to the user, as described above, thereby making it possible to prevent the unpredictable occurrence of problems such as deterioration in controllability and false detection of collisions.

The user, upon receiving the alert, may use the robot 2 while being allowed more leeway in the operation thereof, with an understanding of the possibility of occurrence of problems such as deterioration in controllability and false detection of collisions, or may input, to the robot control device 1, estimation conditions with which execution of highly accurate load-parameter estimation can be expected and may cause the above-described processing to be performed again.

Second Embodiment

A robot control device according to a second embodiment of the present invention will be described in detail below with reference to the drawings. Note that, in the following explanation, since the parameter estimating unit 11 and the torque calculating unit 12 have the same configurations as those in the above-described first embodiment, identical reference signs are assigned thereto, and a description thereof will be omitted.

A robot control device 10 of this embodiment is provided with: a CPU (Central Processing Unit); a main storage device, such as a ROM (Read Only Memory) or a RAM (Random Access Memory); an auxiliary storage device, such as an HDD (Hard Disk Drive); an input device, such as a keyboard; an output device, such as a monitor; an external interface that exchanges various types of data with an external device, such as a robot; and the like, the above-described constituent devices being connected to one another via a bus and being not shown. The auxiliary storage device stores various programs, and, when the CPU reads the programs from the auxiliary storage device into the main storage device, such as the RAM, and executes them, various types of processing are realized.

Figure 3:
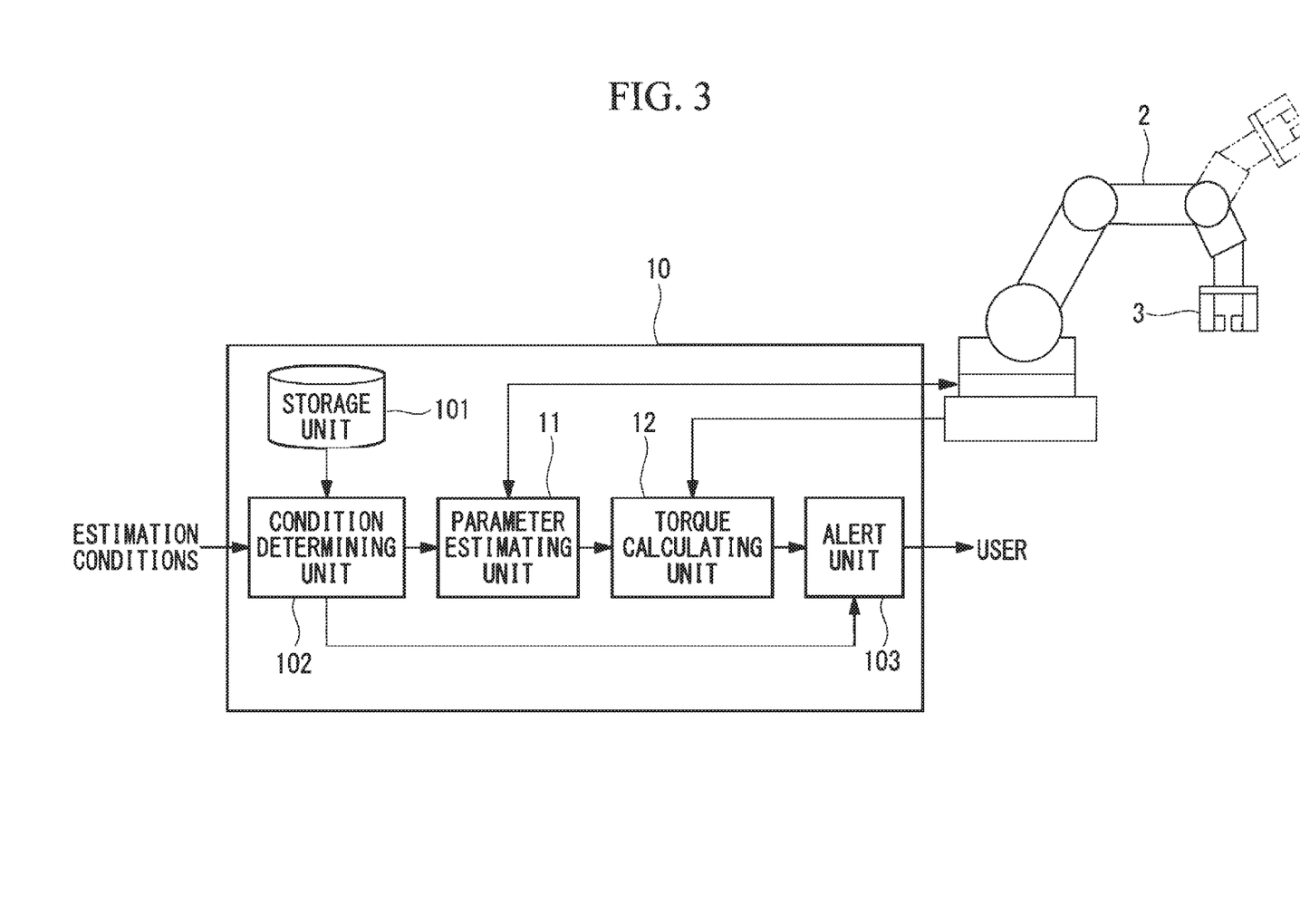
FIG. 3 is a view showing, in outline, the configuration of a robot control device according to a second embodiment of the present invention.

As shown in FIG. 3, the robot control device 10 of this embodiment is provided with, as functional blocks to be executed by the CPU, the parameter estimating unit 11, the torque calculating unit 12, a storage unit 101, a condition determining unit 102, and an alert unit 103.

The storage unit 101 is connected to the condition determining unit 102. The condition determining unit 102 is connected to the storage unit 101, the parameter estimating unit 11, and the alert unit 103. The alert unit 103 is connected to the torque calculating unit 12 and the condition determining unit 102.

The storage unit 101 is constituted by part of the above-described main storage device or auxiliary storage device and is configured to store predetermined recommended estimation conditions that are recommended to perform load-parameter estimation for the load 3, which is attached to the robot 2. The recommended estimation conditions are estimation conditions recommended to estimate a load parameter with required estimation accuracy and are determined in advance from the operation performance, experimental results, etc., of the robot 2.

The condition determining unit 102 is configured to determine, before parameter estimation is actually performed, whether a load parameter can be estimated with sufficient accuracy when parameter estimation is performed under estimation conditions that are input by the user, on the basis of the recommended estimation conditions stored in the storage unit 101. Furthermore, the condition determining unit 102 is configured to deliver the input estimation conditions to the parameter estimating unit 11 only when it is determined that a load parameter can be estimated with sufficient accuracy. Furthermore, the condition determining unit 102 is configured to notify, when it is determined that a load parameter cannot be estimated with sufficient accuracy, the alert unit 103 of a determination result to that effect.

The alert unit 103 is configured to issue an alert to the user via the monitor or the like in response to the determination result from the condition determining unit 102. Furthermore, as in the alert unit 13 in the first embodiment, the alert unit 103 is configured to issue an alert to the user via the monitor or the like only when the difference between the maximum value and the minimum value of the operation torques calculated in the torque calculating unit 12 is equal to or less than the predetermined threshold.

Next, processing performed in the robot control device 10, which has the above-described configuration, will be described with reference to FIGS. 3 to 5.

Figure 4:
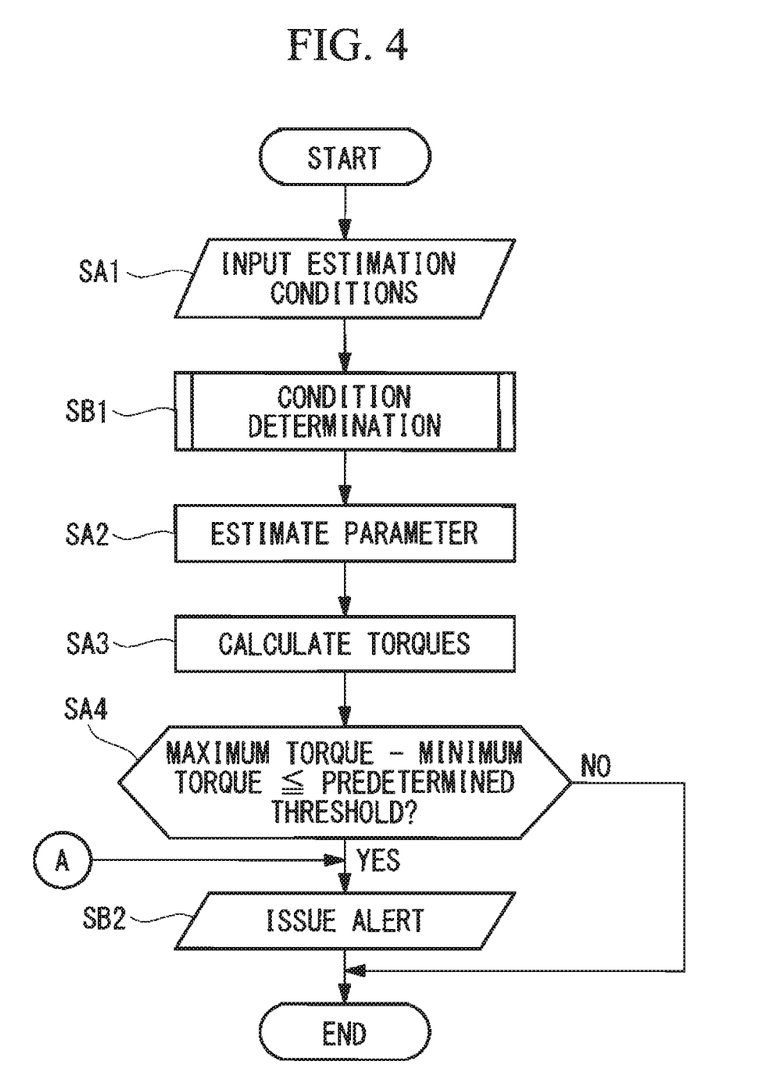
FIG. 4 is a flowchart showing processing performed by the robot control device shown in FIG. 3.

First, when estimation conditions are input by the user (Step SA1 in FIG. 4), the condition determining unit 102 determines whether the input estimation conditions are conditions under which a load parameter can be estimated with sufficient accuracy (Step SB1 in FIG. 4).

Figure 5:
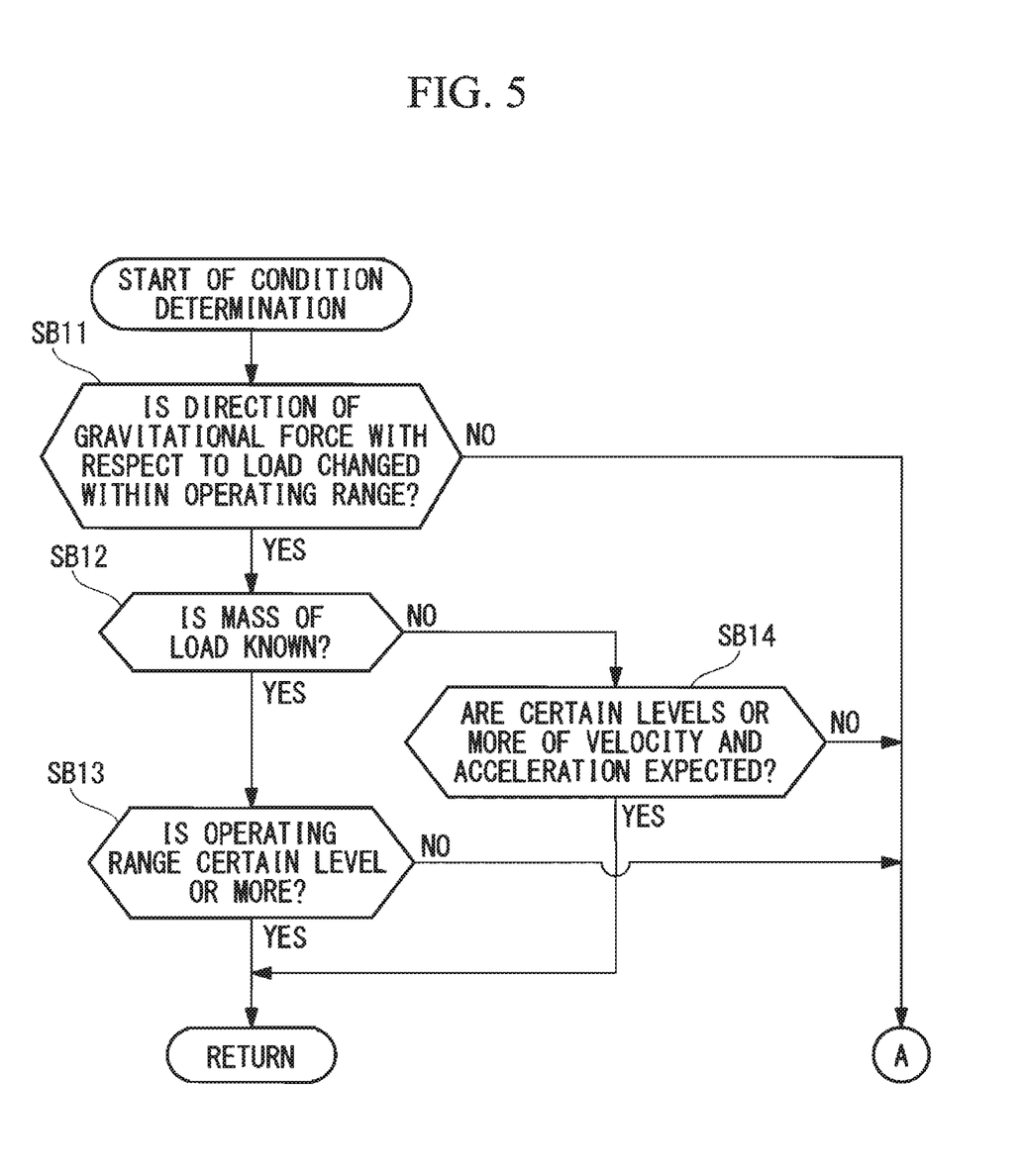
FIG. 5 is a flowchart showing condition determination processing performed in the flowchart shown in FIG. 4.

In Step SB1, specifically, as shown in FIG. 5, first, it is determined whether, when the robot 2 is caused to perform an estimation operation under the input estimation conditions, the direction of the gravitational force with respect to the load 3 is changed within the operating range, i.e., the rotational axis during the operation is shifted from the direction of the gravitational force by a certain level or more (Step SB11 in FIG. 5). If it is determined that the direction of the gravitational force with respect to the load 3 is not changed within the operating range, the alert unit 103 issues an alert to the user (Step SB2 in FIG. 4), and the processing flow ends.

If it is determined that the direction of the gravitational force with respect to the load 3 is changed within the operating range, it is then determined whether the mass of the load 3 is known, i.e., whether the mass of the load 3 is included in the input estimation conditions (Step SB12 in FIG. 5).

If the mass of the load 3 is not known, it is then determined whether, when the robot 2 is caused to perform the estimation operation under the input estimation conditions, certain levels or more of velocity and acceleration are expected, i.e., whether the velocity and the acceleration in the input estimation conditions are equal to or higher than the velocity and the acceleration in the recommended estimation conditions stored in the storage unit 101 (Step SB14 in FIG. 5).

If it is determined that certain levels or more of velocity and acceleration are not expected, the alert unit 103 issues an alert to the user (Step SB2 in FIG. 4), and the processing flow ends. If it is determined that certain levels or more of velocity and acceleration are expected, parameter estimation is performed under the input estimation conditions (Step SA2 in FIG. 4).

If the mass of the load 3 is known, it is then determined whether, when the robot 2 is caused to perform the estimation operation under the input estimation conditions, the operating range is a certain level or more, i.e., the operating range in the input estimation conditions is equal to or greater than the operating range in the recommended estimation conditions stored in the storage unit 101 (Step SB13 in FIG. 5).

If it is determined that the operating range is not the certain level or more, the alert unit 103 issues an alert to the user (Step SB2 in FIG. 4), and the processing flow ends. If it is determined that the operating range is the certain level or more, parameter estimation is performed under the input estimation conditions (Step SA2 in FIG. 4).

Then, the parameter estimating unit 11 causes the robot 2 to operate under the input estimation conditions, thus performing load-parameter estimation for the load 3, which is attached to the robot 2 (Step SA2 in FIG. 4). Next, the torque calculating unit 12 estimates the values of currents flowing in the motors provided in the respective joints of the robot 2 caused to operate during the parameter estimation, and calculates the operation torques of the respective joints on the basis of the measured current values (Step SA3 in FIG. 4). Then, the alert unit 13 determines whether the difference between the maximum torque and the minimum torque of the calculated operation torques is equal to or less than the predetermined threshold (Step SA4 in FIG. 4). Then, if the difference between the maximum torque and the minimum torque is equal to or less than the predetermined threshold, the alert unit 103 issues an alert to the user (Step SB2 in FIG. 4).

In this way, before the robot 2 is caused to perform the estimation operation, it is possible to select, in the condition determining unit 102, estimation conditions with which execution of highly accurate load-parameter estimation can be expected. Accordingly, it is not necessary to cause the robot 2, which is a real machine, to perform a useless estimation operation under estimation conditions with which highly accurate load-parameter estimation cannot be performed. As a result, it is possible to achieve a reduction in the time required for load-parameter estimation.

Furthermore, when the difference between the maximum torque and the minimum torque is equal to or less than the predetermined threshold, an alert is issued to the user, thereby making it possible to prevent the unpredictable occurrence of problems such as deterioration in controllability and false detection of collisions.

The user, upon receiving the alert, may use the robot 2 with an understanding of the possibility of occurrence of problems such as deterioration in controllability and false detection of collisions, or may input, to the robot control device 10, estimation conditions with which execution of highly accurate load-parameter estimation can be expected and may cause the above-described processing to be performed again.

Although the embodiments of the present invention have been described above in detail with reference to the drawings, the specific configurations are not limited to these embodiments, and design changes etc. that do not depart from the scope of the present invention are also encompassed.

For example, although the alert unit 13, 103 in each of the above-described embodiments issues an alert to the user when the difference between the maximum torque and the minimum torque is equal to or less than the predetermined threshold, it is also possible to issue an alert to the user when the difference between the maximum value and the minimum value of the values of currents flowing in the motors, which are measured in the torque calculating unit 12, is equal to or less than a predetermined threshold.

As a result, the above-described embodiments lead to the following aspect.

According to one aspect, the present invention provides a robot control device including: a parameter estimating unit that causes a robot to operate under estimation conditions input by a user and that estimates a load parameter of a load attached to the robot; a torque calculating unit that calculates operation torques of respective joints of the robot caused to operate during estimation of the load parameter; and an alert unit that issues an alert to the user when the difference between the maximum value and the minimum value of the operation torques is equal to or less than a predetermined threshold.

According to this configuration, the parameter estimating unit causes the robot to operate under estimation conditions input by the user and estimates a load parameter of a load attached to the robot. Then, the torque calculating unit calculates operation torques of respective joints of the robot caused to operate during the estimation of the load parameter. Then, the alert unit issues an alert to the user when the difference between the maximum value and the minimum value of the operation torques is equal to or less than the predetermined threshold.

By doing so, the user can recognize that estimation of a load parameter that has a sufficient accuracy has not been performed. As a result, it is possible to prevent the unpredictable occurrence of problems such as deterioration in controllability and false detection of collisions.

In the robot control device according to the above-described one aspect, the torque calculating unit may measure the values of currents flowing in motors provided in the respective joints of the robot and may calculate the operation torques on the basis of the current values.

The robot control device of the above-described one aspect may further include: a storage unit that stores predetermined recommended estimation conditions that are recommended to perform estimation of the load parameter with respect to the robot; and a condition determining unit that determines adequacy or inadequacy of the estimation conditions input by the user, on the basis of the recommended estimation conditions, wherein the estimation conditions may be input to the parameter estimating unit only when the condition determining unit determines that the estimation conditions are adequate.

According to this configuration, the storage unit stores predetermined recommended estimation conditions that are recommended to perform estimation of the load parameter with respect to the robot. Then, the condition determining unit determines adequacy or inadequacy of the estimation conditions input by the user, on the basis of the recommended estimation conditions. Then, the estimation conditions are input to the parameter estimating unit only when the condition determining unit determines that the estimation conditions are adequate.

By doing so, before the robot is caused to perform an estimation operation, it is possible to select, in the condition determining unit, estimation conditions with which execution of highly accurate load-parameter estimation can be expected. Accordingly, it is not necessary to cause the robot, which is a real machine, to perform a useless estimation operation under estimation conditions with which highly accurate load-parameter estimation cannot be performed. As a result, it is possible to achieve a reduction in the time required for load-parameter estimation.

In this robot control device, when the condition determining unit determines that the estimation conditions input by the user are inadequate, the alert unit may issue an alert to the user.

By doing so, before the robot is caused to perform an estimation operation, it is possible to urge the user to input, to the robot control device, estimation conditions with which execution of highly accurate load-parameter estimation can be expected and to cause the above-described processing to be performed again.

According to the present invention, an advantageous effect is afforded in that it is possible to prevent the unpredictable occurrence of problems such as deterioration in controllability and false detection of collisions.

The invention claimed is:

1. A robot control device comprising:
   a parameter estimating unit that causes a robot to operate under estimation conditions input by a user and that estimates a load parameter of a load attached to the robot;
   a torque calculating unit that calculates operation torques of respective joints of the robot caused to operate during estimation of the load parameter; and
   an alert unit that issues an alert to the user when the difference between the maximum value and the minimum value of the operation torques is equal to or less than a predetermined threshold.

2. A robot control device according to claim 1, wherein the torque calculating unit measures the values of currents flowing in motors provided in the respective joints of the robot and calculates the operation torques on the basis of the current values.

3. A robot control device according to claim 1, further comprising:
   a storage unit that stores predetermined recommended estimation conditions that are recommended to perform estimation of the load parameter with respect to the robot; and
   a condition determining unit that determines adequacy or inadequacy of the estimation conditions input by the user, on the basis of the recommended estimation conditions,
   wherein the estimation conditions are input to the parameter estimating unit only when the condition determining unit determines that the estimation conditions are adequate,
   and
   wherein, when the condition determining unit determines that the estimation conditions input by the user are inadequate, the alert unit issues an alert to the user.

* * * * *